US012450143B2

(12) United States Patent
Chen et al.

(10) Patent No.: US 12,450,143 B2
(45) Date of Patent: Oct. 21, 2025

(54) METHOD FOR VISUAL AID PROMPTS AND ELECTRONIC APPARATUS THEREOF

(71) Applicant: ASUSTek COMPUTER INC., Taipei (TW)

(72) Inventors: Yung-Hsiang Chen, Taipei (TW); Li-Wei Hung, Taipei (TW); Hung-Chieh Wu, Taipei (TW)

(73) Assignee: ASUSTek COMPUTER INC., Taipei (TW)

( * ) Notice: Subject to any disclaimer, the term of this patent is extended or adjusted under 35 U.S.C. 154(b) by 72 days.

(21) Appl. No.: 18/644,142

(22) Filed: Apr. 24, 2024

(65) Prior Publication Data

US 2025/0252031 A1 Aug. 7, 2025

(30) Foreign Application Priority Data

Feb. 5, 2024 (TW) .................................. 113104438

(51) Int. Cl.
*G06F 11/32* (2006.01)
*G06F 16/955* (2019.01)

(52) U.S. Cl.
CPC .......... *G06F 11/328* (2013.01); *G06F 16/955* (2019.01)

(58) Field of Classification Search
None
See application file for complete search history.

(56) References Cited

U.S. PATENT DOCUMENTS

| 10,955,961 B2 | 3/2021 | Lewis |
| 2014/0139431 A1 | 5/2014 | Tseng et al. |
| 2021/0195166 A1* | 6/2021 | Tsai ..................... H04N 23/631 |

FOREIGN PATENT DOCUMENTS

| CN | 101098425 | 1/2008 |
| CN | 106250296 | 2/2020 |
| TW | 201421350 | 6/2014 |
| TW | I771558 | 7/2022 |

* cited by examiner

*Primary Examiner* — Scott C Sun
(74) *Attorney, Agent, or Firm* — JCIPRNET

(57) ABSTRACT

Disclosed are a method for visual aid prompts and an electronic apparatus thereof. After a sensor adjacent to a connection interface configured on a display is driven for operation, when the sensor detects an object entering a specified range, a processor provides a driving signal to the display. The display presents at least one graphical interface on the display screen according to the driving signal, and the graphical interface includes a schematic diagram corresponding to the connection interface. The processor determines whether the connection interface is being used, and further dynamically adjusts a content presented by the graphical interface.

16 Claims, 4 Drawing Sheets

METHOD FOR VISUAL AID PROMPTS AND ELECTRONIC APPARATUS THEREOF

CROSS-REFERENCE TO RELATED APPLICATION

This application claims the priority benefit of Taiwan application serial no. 113104438, filed on Feb. 5, 2024. The entirety of the above-mentioned patent application is hereby incorporated by reference herein and made a part of this specification.

BACKGROUND

Technical Field

The disclosure relates to an assistance method and an apparatus, and in particular to a method for visual aid prompts and an electronic apparatus thereof.

Description of Related Art

An all-in-one (AIO) computer is designed with narrow bezels in order to save space. In this structure, nearly every input hole and output hole of ports and slots is located on the back or at the bottom, which is not only difficult for users to plug and unplug, but even completely unnoticeable. Therefore, if the location and content of the connection interface are to be seen for the convenience of the users when the users utilize these ports or slots, the best way to show the location and content clearly is to turn the entire computer around to the back. However, as the computer is not relatively lightweight, turning the computer over is not easy for a user. Nonetheless, if the computer is not turned over, the user is unlikely to see the location of the connection interface and the type to which a port or slot corresponds from the front.

SUMMARY

The disclosure provides a method for visual aid prompts and an electronic apparatus thereof, facilitating users in knowing the location where the connection interface is configured at any time.

The method for visual aid prompts herein is applicable to an electronic apparatus. The electronic apparatus includes a display, a sensor, and a processor. The display has a display area, which is suitable for providing a display screen, and a non-display area, in which a connection interface is configured. Moreover, the sensor is adjacent to the connection interface. The method for visual aid prompts includes the following steps. The sensor is driven by the processor for operation. When the sensor detects the entrance of an object into a specified range, a driving signal is provided to the display by the processor, allowing the display to present at least one graphical interface on the display screen according to the driving signal. A schematic diagram corresponding to the connection interface is included in the at least one graphical interface. Whether the connection interface is being used is also determined by the processor, and the content presented by the graphical interface is further dynamically adjusted.

The electronic apparatus of the disclosure includes: a display that has a display area, which is used to provide a display screen, and a non-display area, in which a connection interface is configured; a sensor that is configured adjacent to the connection interface; and a processor coupled to the display, the connection interface and the sensor. The processor is configured to implement the above-mentioned method for visual aid prompts.

Based on the above, in this disclosure, a graphical interface of the connection interface is presented on the display screen corresponding to the location where the connection interface is configured. Users do not need to rotate or lift the display to ascertain the actual location of the connection interface configured on the display. Thus, convenience in terms of usage is significantly increased.

DESCRIPTION OF THE EMBODIMENTS

Figure 1:
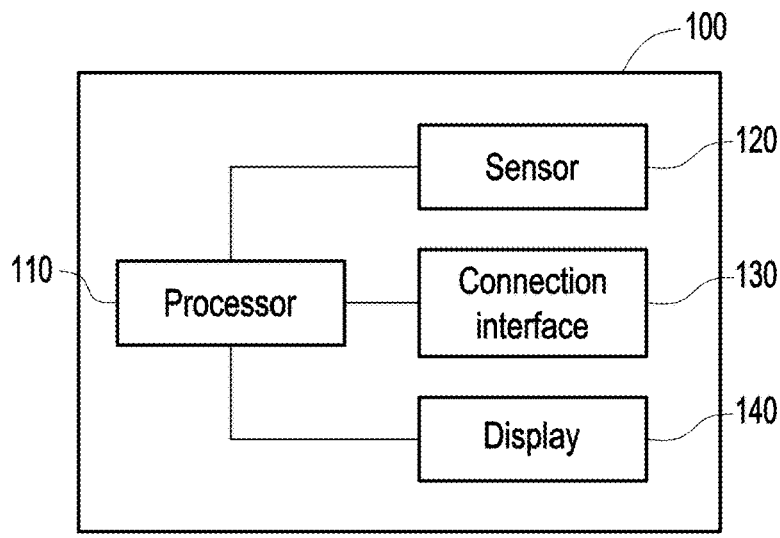
FIG. 1 is a block diagram of an electronic apparatus according to an embodiment of the disclosure.

FIG. 1 is a block diagram of an electronic apparatus according to an embodiment of the disclosure. Please refer to FIG. 1. An electronic apparatus 100 includes a processor 110, a sensor 120, a connection interface 130, and a display 140. The display 140 has a display area and a non-display area. The display area is used to provide a display screen. The non-display area is, for example, on the side or the back of the casing of the display 140. The connection interface 130 is also configured in the non-display area. The sensor 120 is configured adjacent to the connection interface 130. In an embodiment, the sensor 120 is arranged around the connection interface 130 in a manner that the sensing range of the sensor 120 covers the connection interface 130 and a specified range. As a result, a hand of a user can be detected through the sensor 120 to see if the user is about to utilize one of the ports of the connection interface 130 for plugging and unplugging.

The processor 110 is, for example, a central processing unit (CPU), a physics processing unit (PPU), a programmable microprocessor, an embedded control chip, a digital signal processor (DSP), an application specific integrated circuit (ASIC), or other similar apparatus.

The sensor 120 is used to detect whether an object enters the specified range. In an embodiment, a proximity sensor may be adopted as the sensor 120. A proximity sensor often emits an electromagnetic field or a beam of electromagnetic radiation (infrared, for instance), and looks for changes in the field or return signal to determine the distance between the sensor and the detected object.

The connection interface 130 includes at least one port and/or at least one slot. For example, the port may be a high definition multimedia interface (HDMI) input port, an HDMI output port, a Universal Serial Bus (USB) Type-A port, a USB Type-B port, a USB Type-C port, an audio port, and other input/output ports. The slot may be a memory card slot and the like.

For the display 140, a liquid crystal display (LCD), a plasma display, an organic light-emitting diode (OLED) display, and other displays may be adopted, for example.

The electronic apparatus 100 also includes a storage. The storage contains one or a plurality of code snippets, which are executed through the processor 110 after installation to implement the subsequent method for visual aid prompts. The storage may be any type of stationary or mobile random-access memory (RAM), read-only memory (ROM), flash memory, hard drives, or other similar apparatus or a combination of these apparatus.

Figure 2:
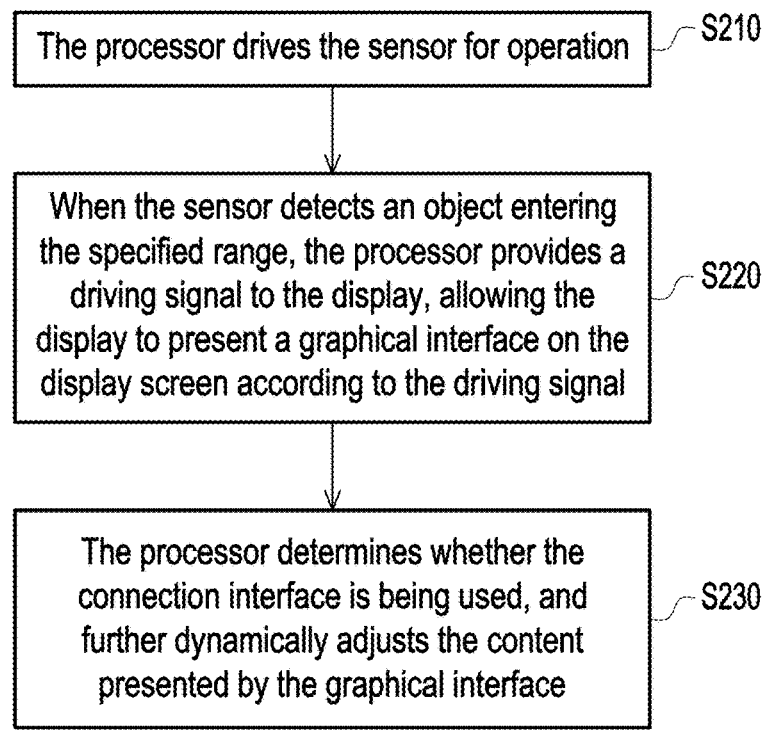
FIG. 2 is a flowchart of a method for visual aid prompts according to an embodiment of the disclosure.

FIG. 2 is a flowchart of a method for visual aid prompts according to an embodiment of the disclosure. Please refer to both FIG. 1 and FIG. 2. In Step S210, the processor 110 drives the sensor 120 for operation, thereby detecting through the sensor 120 whether an object enters the specified range. In an embodiment, the sensing range of a sensor 120 is greater than a specified range. Specifically, when an object enters the sensing range of the sensor 120, the distance between the object and the sensor 120 is measured through the sensor 120. Then, the processor 110 determines whether the object falls within the specified range according to the aforementioned distance.

In Step S220, when the sensor 120 detects an object entering the specified range, the processor 110 provides a driving signal to the display 140, allowing the display 140 to present a graphical interface on the display screen according to the driving signal. The graphical interface herein includes a schematic diagram corresponding to the connection interface 130. For example, the processor 110 is displayed on the graphical interface on the display screen of the display 140 and corresponds to the position of the connection interface 130.

Subsequently, in Step S230, the processor 110 determines whether the connection interface 130 is being used, and further dynamically adjusts the content presented by the graphical interface. Specifically, in response to detecting an external apparatus connecting to the connection interface 130, the processor 110 acquires the information of the external apparatus and displays a message corresponding to the information of the external apparatus on the graphical interface. After detecting the connection between an external apparatus and the connection interface, when the external apparatus is detected to be removed from the connection interface 130, the message corresponding to the information of the external apparatus is removed from the graphical interface in response.

In an embodiment, if a port or a slot of the connection interface 130 is being used, the object image corresponding to the used port or slot on the graphical interface is switched to an image indicating the usage of the port or slot. The information of the connected external apparatus (e.g., the name of the apparatus) is also displayed on the graphical interface. Images indicating the usage or idle condition corresponding to each port or slot of the connection interface 130 is configured. When not in use, the image indicating the idle condition is displayed on the graphical interface. On the other hand, the image indicating the usage is displayed in the graphical interface when in use. Therefore, if the port HDMI-1 of the connection interface 130 is inserted with a connection terminal of a game console, the object image corresponding to the port HDMI-1 on the graphical interface turns into the image indicating the usage. Further, the name of the game console is also displayed. When the connection terminal of the game console is removed from the port HDMI-1, the object image corresponding to the port HDMI-1 on the graphical interface turns into the image indicating the idle condition. The name of the game console is also removed from the graphical interface.

When determining the entrance of an object to the specified range, the processor 110 makes further determination according to the size or time of stay of the object in order to filter out situations where pets pass through the specified range or when the user merely passes by temporarily without the intention of plugging or unplugging using the connection interface 130.

For example, the processor 110 may be set to determine whether to provide a driving signal to the display 140 according to whether the size of the object falls within a specific range. In response to the size of the object falling within the specific range, the processor 110 provides a driving signal to the display 140 to show the graphical interface. If the size of the object does not falling within the specific range, no driving signal is provided to the display 140 in response.

In an embodiment, the sensor 120 is an infrared sensor which can be further used in conjunction with other sensors or apparatus, such as ultrasonic sensors, radio frequency sensors, or camera apparatus (configured to capture the sensing range of the sensor 120), to detect the area of an object, thereby obtaining the size of the object. However, the disclosure is not limited thereto.

In another embodiment, when the sensor 120 is used to determine that an object has entered a specified range, the processor 110 may drive a camera apparatus to capture images and utilize image processing technologies or AI algorithms to determine whether the size of the object falls within a specific range.

In addition, the processor 110 may also be set to determine whether the time of stay of an object in the specified range exceeds a default value. In response to the time of stay of the object in the specified range exceeding the default value, the processor 110 provides a driving signal to the display 140. If the time of stay of the object in the specified range does not exceed the default value, the processor 110 does not provide a driving signal to the display 140 in response.

Alternatively, the processor 110 may also be set to provide a driving signal to the display 140 in response to the object's size falling within a specific range and the time of stay of the object in the specified range exceeding the default value.

In another embodiment, the processor 110 may also be set to provide a driving signal to the display 140 due to the triggering of a physical button.

Figure 3:
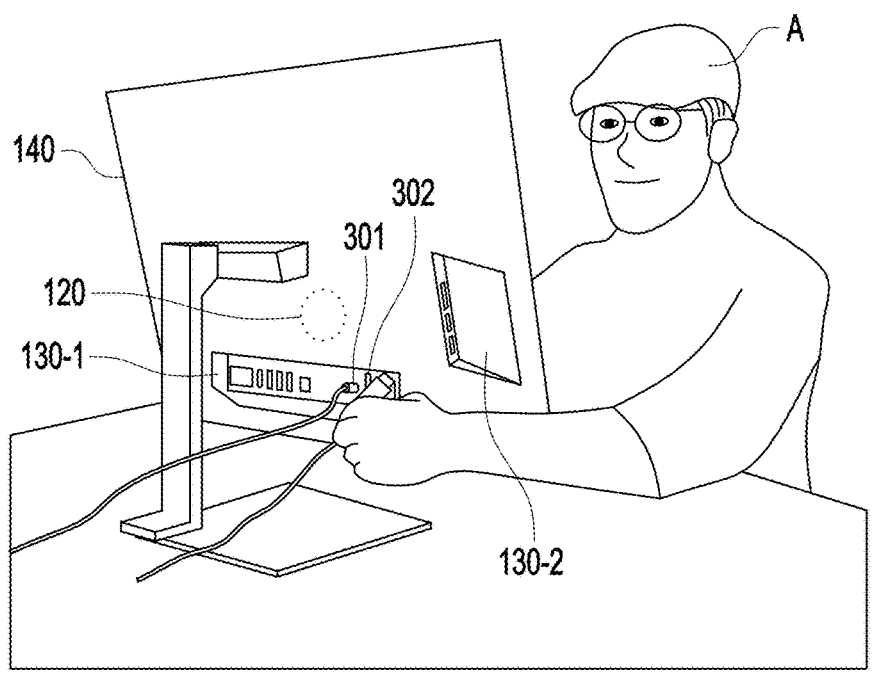
FIG. 3 is a schematic diagram of using the connection interface according to an embodiment of the disclosure.
Figure 4:
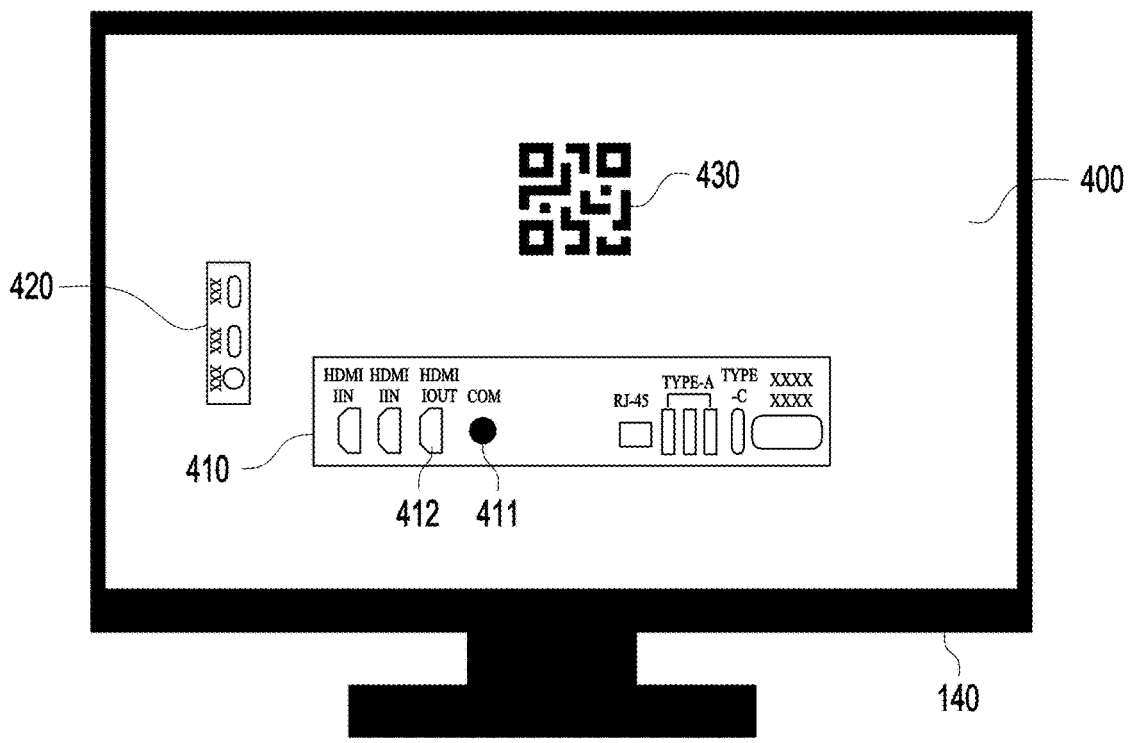
FIG. 4 is a schematic diagram of presenting a graphical interface on the display screen according to an embodiment of the disclosure.

FIG. 3 is a schematic diagram of using the connection interface according to an embodiment of the disclosure. FIG. 4 is a schematic diagram of presenting a graphical interface on the display screen according to an embodiment of the disclosure. In this embodiment, connection interfaces 130-1 and 130-2 are configured on the back of the casing (non-display area) of the display 140. From the front of the display 140, a user A is unable to see the connection interfaces 130-1 and 130-2 configured on the back. Thus, the sensor 120 is used to detect whether a hand of the user A moves into a specified range at the back of the display 140.

When the sensor 120 detects an object (i.e., a hand of a user) entering the specified range, the processor 110 presents a graphical interface 410 corresponding to the connection interface 130-1 and a graphical interface 420 corresponding to the connection interface 130-2 on a display screen 400 of the display 140. The graphical interfaces 410 and 420 are presented in schematic diagrams corresponding to the appearance of connection interfaces 130-1 and 130-2, respectively. Moreover, if the connection interface 130-1 actually includes 10 ports, the graphical interface 410 also includes 10 object images corresponding to the 10 actual ports. For example, a port 301 corresponds to an object image 411, and a port 302 corresponds to an object image 412. As shown in FIG. 3, as the port 301 is being used, the corresponding object image 411 in the graphical interface 410 is switched to an image indicating the usage. On the other hand, the port 302 is not in use. Thus, an image indicating the idle condition is represented as the corresponding object image 412 in the graphical interface 410.

The graphical interfaces 410 and 420 further show textual information associated with the corresponding connection interfaces 130-1 and 130-2. For example, for each of the ports included in the connection interfaces 130-1 and 130-2, the graphical interfaces 410 and 420 show the shape corresponding to the appearance of each port as well as the corresponding name of each port.

In addition, after driving the display of the graphical interfaces 410 and 420, the processor 110 further provides a link information 430 to the display screen 400 for the connection to a description web page via the link information 430. The link information is used to provide the address of the description web page. For example, in this embodiment, the link information 430 is a quick response code (QR code), allowing the user A to scan the QR code with a mobile apparatus or another electronic apparatus equipped with a scanner, thereby accessing the description web page through the mobile apparatus. Furthermore, the user A may also display the description web page on the display screen 400 by clicking on the link information 430 directly with an input apparatus, for example, a mouse.

Figure 5:
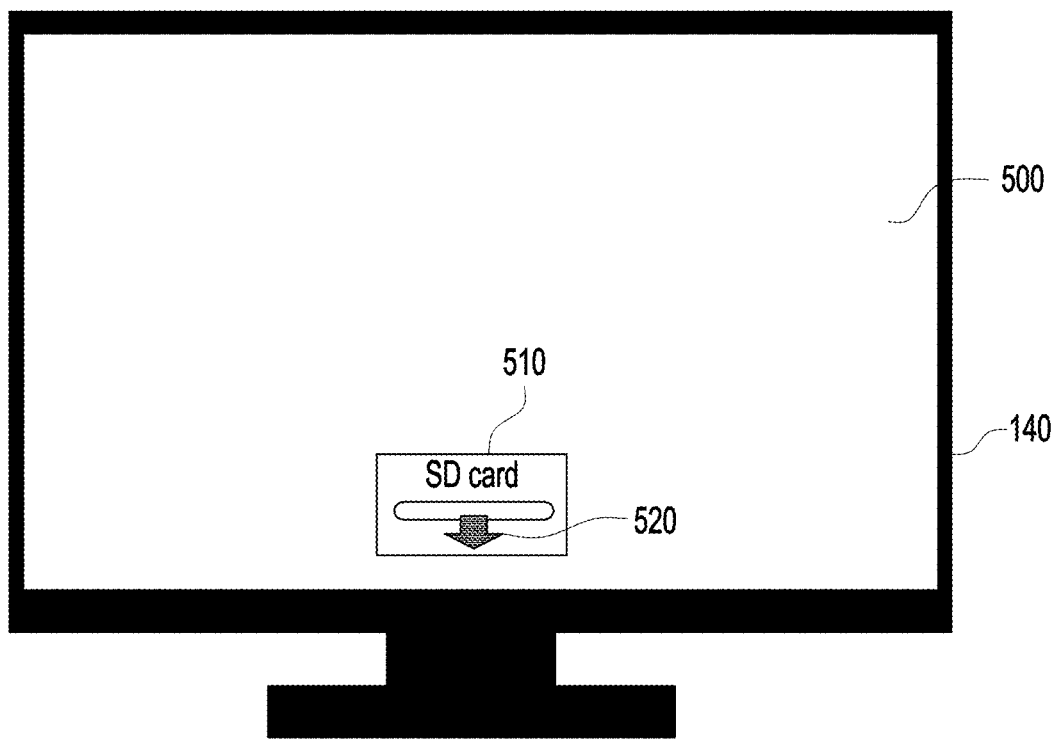
FIG. 5 is a schematic diagram of presenting a graphical interface on the display screen according to another embodiment of the disclosure.

FIG. 5 is a schematic diagram of presenting a graphical interface on the display screen according to another embodiment of the disclosure. Please refer to FIG. 5. A connection interface (e.g., a memory slot) configured below the casing of the display 140 is used for description in this embodiment. When the movement of the hand of the user A to the bottom of the display 140 is detected, a display screen 500 is driven to display a graphical interface 510. Additionally, a physical button or a virtual button may also be configured. When the physical or virtual button is triggered, the display screen 500 is driven to display the graphical interface 510. When the graphical interface 510 is displayed on the display screen 500, an arrow 520 indicating the actual location of the configured connection interface is shown.

Figure 6:
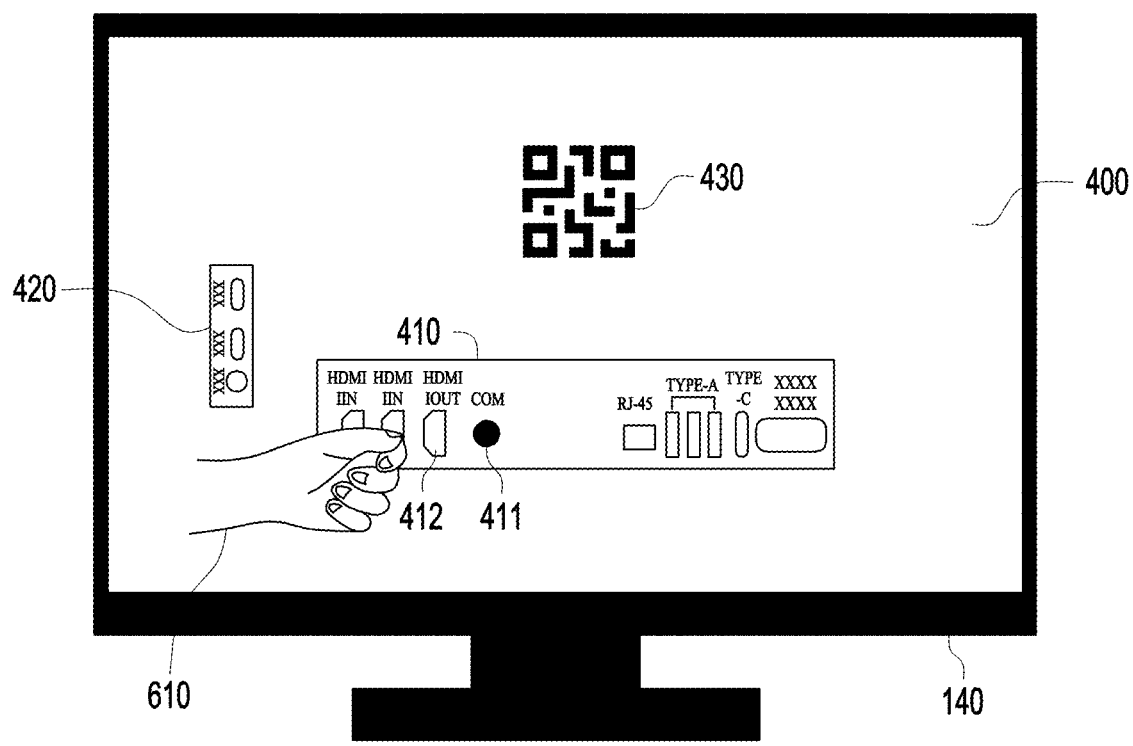
FIG. 6 is a schematic diagram of presenting a graphical interface on the display screen according to another embodiment of the disclosure.

FIG. 6 is a schematic diagram of presenting a graphical interface on the display screen according to another embodiment of the disclosure. In this embodiment, the processor 110 may also continuously detect the path of the movement of an object (e.g., the hand of the user A shown in FIG. 3) within a specified range through the sensor 120 and generate the information of the path in correspondence. Subsequently, the processor 110 generates an adjustment signal according to the information of the path. As shown in FIG. 6, according to the adjustment signal, the display 140 shows an indicator schematic diagram 610 corresponding to the hand of the user A on the display screen 400.

When the hand of the user A enters a specified range and moves in correspondence with the connection interface 130-1, the display screen 400 not only displays graphical interfaces 410 and 420, but also shows the indicator schematic diagram 610 simultaneously (by, e.g., using a virtual hand object). Further, the indicator schematic diagram 610 moves in accordance with the information of the path. For example, if the hand of the user A moves from the left side of the display 140 to the right, the indicator schematic diagram 610 on the display screen 400 also moves from left to right. After the indicator schematic diagram 610 moves onto the graphical interface, the actual destination of the hand of the user A may be identified through the location of the indicator schematic diagram 610 on the graphical interface.

In summary, in the disclosure, when the entrance of an object into a specified range is detected using a sensor, a graphical interface of a connection interface is presented at a location on a display screen corresponding to the actual location where the connection interface is configured. Users do not need to rotate or lift the display to ascertain the actual location of the connection interface configured on the display. Instead, users may simply look at the graphical interface on the display screen while performing blind insertions. Hence, as the computer no longer needs to be turned over, convenience in terms of usage is significantly increased.

What is claimed is:

1. A method for visual aid prompt and applicable to an electronic apparatus, the electronic apparatus comprising a display, a sensor, and a processor, wherein the display has a display area and a non-display area, the display area being suitable for providing a display screen and the non-display area having a connection interface configured therein, wherein the sensor is adjacent to the connection interface, the method for visual aid prompt comprising:
    using the processor to drive the sensor for operation;
    providing, by the processor, a driving signal to the display when the sensor detects an object entering a specified range, wherein the display presents at least one graphical interface on the display screen according to the driving signal, and the at least one graphical interface comprises a schematic diagram corresponding to the connection interface; and
    determining, by the processor, whether the connection interface is being used, and further dynamically adjusting a content presented by the at least one graphical interface.

2. The method of claim 1, wherein the sensor detects the object entering the specified range, upon which the method further comprises:
    determining, by the processor, whether a size of the object falls within a specific range;
    providing, by the processor, the driving signal to the display in response to the size of the object falling within the specific range; and
    rejecting, by the processor, to provide the driving signal to the display in response to the size of the object falling outside the specific range.

3. The method of claim 1, wherein the sensor detects the object entering the specified range, upon which the method further comprises:
    determining, by the processor, whether a time of stay of the object in the specified range exceeds a default value;
    providing, by the processor, the driving signal to the display in response to the time of stay of the object in the specified range exceeding the default value; and
    rejecting, by the processor, to provide the driving signal to the display in response to the time of stay of the object in the specified range not exceeding the default value.

4. The method of claim 1, wherein the sensor detects the object entering the specified range, upon which the method further comprises:
    providing, by the processor, the driving signal to the display in response to a size of the object falling within a specific range and a time of stay of the object in the specified range exceeding a default value.

5. The method of claim 1, wherein the sensor detects the object entering the specified range, upon which the method further comprises:

providing, by the processor, the driving signal and a link information to the display, the display presenting the at least one graphical interface on the display screen according to the driving signal in order to show the link information on the display screen, wherein the link information serves to provide an address of a description web page.

6. The method of claim 1, wherein the processor determining whether the connection interface is being used and further dynamically adjusting the content presented by the at least one graphical interface further comprising:

detecting, by the processor, a path of a movement of the object within the specified range through the sensor continuously, and generating an information of the path in correspondence;

generating, by the processor, an adjustment signal according to the information of the path; and presenting, by the display, the at least one graphical interface on the display screen according to the adjustment signal, wherein the at least one graphical interface comprises a schematic diagram of the connection interface and an indicator schematic diagram.

7. The method of claim 1, wherein the processor determining whether the connection interface is being used and further dynamically adjusting the content presented by the at least one graphical interface further comprising:

acquiring, by the processor, an information of an external apparatus in response to detecting the external apparatus connecting to the connection interface, and displaying a message corresponding to the information of the external apparatus on the at least one graphical interface; and removing, after a connection between the external apparatus and the connection interface is detected, the message corresponding to the information of the external apparatus from the at least one graphical interface by the processor in response to detecting the external apparatus being removed from the connection interface.

8. The method of claim 1, wherein the at least one graphical interface further comprises a textual information associated with the connection interface.

9. An electronic apparatus, comprising:

a display having a display area and a non-display area, wherein the display area is used to provide a display screen and the non-display area has a connection interface configured therein;

a sensor adjacent to the connection interface; and a processor coupled to the display, to the connection interface and to the sensor, wherein the processor is configured to:

drive the sensor for operation;

provide a driving signal to the display when the sensor detects an object entering a specified range, allowing the display to present at least one graphical interface on the display screen according to the driving signal, wherein the at least one graphical interface comprises a schematic diagram corresponding to the connection interface; and determine whether the connection interface is being used, and further dynamically adjusting a content presented by the at least one graphical interface.

10. The electronic apparatus of claim 9, wherein the sensor detects the object entering the specified range, upon which the processor is configured to:

determine whether a size of the object falls within a specific range;

provide the driving signal to the display in response to the size of the object falling within the specific range; and reject to provide the driving signal to the display in response to the size of the object falling outside the specific range.

11. The electronic apparatus of claim 9, wherein the sensor detects the object entering the specified range, upon which the processor is configured to:

determine whether a time of stay of the object in the specified range exceeds a default value;

provide the driving signal to the display in response to the time of stay of the object in the specified range exceeding the default value; and reject to provide the driving signal to the display in response to the time of stay of the object in the specified range not exceeding the default value.

12. The electronic apparatus of claim 9, wherein the sensor detects the object entering the specified range, upon which the processor is configured to:

provide the driving signal to the display in response to a size of the object falling within a specific range and a time of stay of the object in the specified range exceeding a default value.

13. The electronic apparatus of claim 9, wherein the processor is configured to:

provide the driving signal and a link information to the display when the sensor detects the object entering the specified range in order to present the at least one graphical interface and the link information on the display screen, wherein the link information serves to provide an address of a description web page.

14. The electronic apparatus of claim 9, wherein the processor is configured to:

detect a path of a movement of the object within the specified range through the sensor continuously, and generating an information of the path in correspondence;

generate an adjustment signal according to the information of the path; and present the at least one graphical interface on the display screen according to the adjustment signal, wherein the at least one graphical interface comprises a schematic diagram of the connection interface and an indicator schematic diagram.

15. The electronic apparatus of claim 9, wherein the processor is configured to:

acquire an information of an external apparatus in response to detecting the external apparatus connecting to the connection interface, and displaying a message corresponding to the information of the external apparatus on the at least one graphical interface; and remove, after a connection between the external apparatus and the connection interface is detected, the message corresponding to the information of the external apparatus from the at least one graphical interface in response to detecting the external apparatus being removed from the connection interface.

16. The electronic apparatus of claim 9, wherein the at least one graphical interface further comprises a textual information associated with the connection interface.

* * * * *